May 3, 1927. Re. 16,615
H. HOVLAND
AUTOMATIC TELEPHONE SYSTEM
Original Filed Dec. 29, 1924
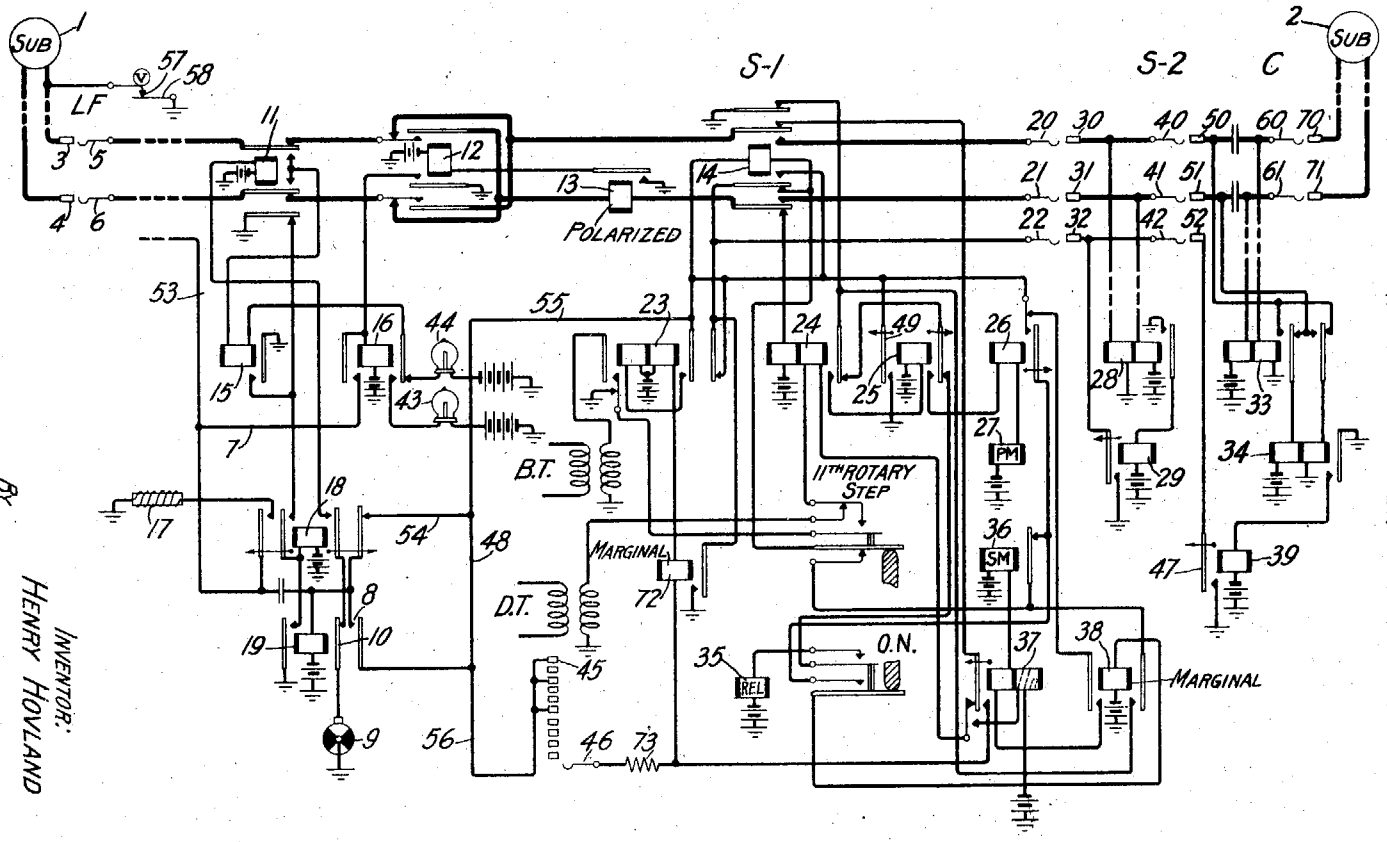
INVENTOR:
HENRY HOVLAND
BY W. McFarney
ATTORNEY Reissued May 3, 1927. Re. 16,615

UNITED STATES PATENT OFFICE.

HENRY HOVLAND, OF FLUSHING, NEW YORK, ASSIGNOR TO WESTERN ELECTRIC COMPANY, INCORPORATED, OF NEW YORK, N. Y., A CORPORATION OF NEW YORK.

AUTOMATIC TELEPHONE SYSTEM.

Original No. 1,614,959, dated January 18, 1927, Serial No. 758,592, filed December 29, 1924. Application for reissue filed March 23, 1927. Serial No. 177,777.

This invention relates to machine switching telephone exchange systems, and more particularly to systems employing grounded signaling from the substations, and is particularly adapted for systems wherein the substations are provided with coin collectors.

The object of this invention is to permit a calling party to build up a connection to certain lines, for example, to the "0" operator, without depositing a coin while preventing the calling subscriber from building up a connection to an ordinary line, unless the coin is first deposited.

A further object of this invention is to provide means to prevent the extension of a calling line to a desired called line if the calling subscriber attempts to simulate the deposit of a coin.

In accordance with this invention all lines are reached via a certain group of selector switches, the ordinary lines via certain levels of said switches and the free lines via certain other levels of said switches. Each switch is provided with a test relay which is responsive to the deposit of a coin at the calling substation on calls to an ordinary line. This relay in responding prepares the switch to extend the connection to the subsequent switch or switches of the train. On calls to free lines an alternative circuit is provided for causing said test relay to respond and permit the establishing of a connection with a free line. If for any reason the test relay does not respond due to the absence of the required circuit condition, the selector switch operates in accordance with its secondary movement and advances to a setting known as the "11th rotary step position", where it remains until the calling substation disconnects.

In the drawing comprising but a single sheet, the invention is diagrammatically set forth. The calling substation is represented at 1 and a typical called substation at 2. The selector switch S—1 is wired in accordance with this invention and has access to another selector switch S—2, which in turn has access to a connector C.

The invention will be more readily understood from a detailed description of the operation of the system.

*Ordinary call.*

When the receiver is removed at the substation 1 the brushes 5 and 6 of the line finder LF are set upon the terminals 3 and 4 of the calling line in a manner not shown and the connection is extended to the selector switch S—1, closing a circuit to operate the impulse relay 24 in series with the polarized relay 13 and the loop of the calling substation 1. The polarized relay does not operate at this time due to the fact that the direction of the flow of current in its winding is not in the proper direction to operate it. Relay 24 operated closes an obvious circuit to operate slow to release relay 25. A circuit is now closed to operate relay 19 by way of 54, 55 and 49. Relay 19 operated locks by way of its armature 8, conductors 48 and 55 and armature 49 of relay 25 to ground. Relay 19 operated renders the interrupter 9 ineffective. The operation of relay 19 closes an obvious circuit to operate relay 18, which locks under control of relay 11 and connects ground by way of the retardation coil 17 and conductor 53 to the line finder LF to prevent the line finder LF from releasing.

The dial at the calling substation 1 is now operated and released in accordance with the first digit of the number of the called line. As the dial returns to normal the loop at the calling substation 1 is interrupted, thus producing impulses in the circuit including the impulse relay 24, which relay follows the impulses. When relay 24 releases, a circuit is completed by way of its armature and back contact to operate the primary magnet 27 and slow to release relay 26 in series. Relays 25 and 26 are made slow to release, so that they will remain operated during the impulse period. Each time the primary magnet 27 operates, a brush rod (not shown) carrying the brushes 20, 21 and 22 is advanced step by step, in accordance with the primary movement of the selector switch S—1, depending upon the number of impulses produced by the calling dial. During the first step of the selector rod, the off-normal contact springs ON are closed, closing a circuit to operate the marginal relay 38. This circuit may be traced under control of the off-normal contact springs ON, alternate contacts of relay 26 to ground at the left contact of relay 25. Relay 38 operated locks under control of the secondary magnet 36 and its own right hand armature and front contact to ground under control of relay 14. When the dial of the calling substation 1 returns to normal, relay 24 remains operated and relay 26 releases. Relay 26 released closes a circuit to operate the secondary magnet 36 and relay 37 in series under control of the normal contacts of relay 26 and armature 49 of relay 25. The operation of the secondary magnet 36 advances the brushes 20, 21 and 22 of the selector switch S—1, one step in accordance with the secondary movement of the switch. The operation of relay 37 substitutes the right winding of relay 23 and the winding of relay 72 for the right winding of relay 24 in series with one side of the calling line loop. If a coin has been deposited in the coin controlled mechanism at the calling substation 1, a circuit will be established from battery, through the winding of relay 23, winding of marginal relay 72, through a pair of contact springs 57 and 58 closed by the deposit of the coin at the substation 1, to ground. Relay 23 functions as a test relay and will not operate unless the ground condition described is encountered. Relay 72 being marginal does not operate at this time. Relay 23 operated locks by way of its inner right hand armature and front contact, and armature 49 of relay 25 to ground.

The operation of the secondary magnet 36 opens the locking circuit for the marginal relay 38 which releases, in turn releasing the secondary magnet 36. Relay 37 being slow to release does not release during brief interruptions of its circuit.

*Testing for an idle trunk.*

The brushes 20, 21, and 22 of the selector switch S—1 are now resting on the terminals associated with the first trunk in the selected trunk level. We will assume that this trunk is busy, in which case relays similar to 28 and 29 will be operated, connecting ground to the test terminal corresponding to the terminal 32. Under these circumstances, a circuit is closed to reoperate relay 38. This circuit may be traced under control of the off-normal contact springs ON, armature and back contact of the secondary magnet 36, normal contacts of the eleventh rotary step springs, normal contact and armature of relay 14, brush 22, terminal corresponding to 32 to ground. Marginal relay 38 reoperates over the circuit traced and locks, as previously described, thus closing the circuit previously described to operate the secondary magnet 36 in series with the relay 37. The operation of the secondary magnet 36 opens the locking circuit for the marginal relay 38, which releases, in turn, opening the operating circuit for the secondary magnet 36 and relay 37 in series. The operation of the secondary magnet 36 likewise advances the brushes 20, 21, and 22 another step in accordance with the secondary movement of the selector switch S—1. This cycle of operation continues until an idle trunk is found.

We will assume the idle trunk to be the one associated with the selector switch S—2, in which case terminal 32 will be free from ground. With the brushes 20, 21, and 22 resting upon the terminals 30, 31, and 32, respectively, of the selector switch S—2, terminal 32 being ungrounded, a circuit is closed to operate relay 14 is series with marginal relay 38. This circuit may be traced from battery through the winding of relay 38, through the off-normal contact spring ON, armature and back contact of the secondary magnet 36, normal contacts of the eleventh rotary step springs, winding of relay 14 to ground at armature 49 of relay 25. It should be observed that while the brush 22 was passing over the terminals of busy lines, the ground encountered on these terminals short circuited the winding of the relay 14, but when an idle trunk is encountered the absence of ground on the test terminal 32 permits relay 14 to operate in series with relay 38. Relay 38, which is marginal, will not operate at this time due to the high resistance of the winding of relay 14 in series with it. The operation of relay 14 extends the connection to the selector switch S—2 and a circuit is now closed to operate the impulse relay 28 in series with the polarized relay 13 and the line loop of the calling substation 1. Relay 28 operates over this circuit, closing an obvious circuit to operate slow-to-release relay 29, thus connecting ground to the test terminal 32, thence by way of brush 22 to the lower inner armature and front contact of relay 14. The operation of relay 14 disconnects the impulse relay 24 of the selector switch S—1 from the circuit. Relay 24 releases, in turn releasing relay 25, but the latter being slow to release remains operated long enough to permit sufficient time to elapse for relays 28 and 29 to operate and connect ground by way of the test terminal 32 and the brush 22 to the winding of relay 14 before, by the release of relay 25, the operating ground for relay 14 is removed at armature 49 of relay 25.

The selector switch S—2 is set in the same general manner as the selector switch S—1, except that the impulse relay 28 is employed to operate the switch setting mechanism (not shown). The selector switch S—2 is set upon the terminals of an idle connector switch, which we will assume to be the connector switch C, in which case the brushes 40, 41, and 42 come to rest upon the terminals 50, 51, and 52, and the impulse relay 34 of the connector C is operated in series with the loop of the calling substation 1, closing an obvious circuit to operate the slow-to-release relay 39, which connects ground at its armature 47 to the test terminal 52 of the connector C, thus providing a busy condition at the test terminal 52 besides holding the switches S—1 and S—2 operated.

The polarized relay 13, which is in series with the various impulse relays 24, 28, and 34 in succession, does not operate because the flow of current through its winding is not in the proper direction to operate said polarized relay.

The called substation 2 is signaled in any desired manner and when the receiver is removed at the called substation 2, a circuit is closed to operate relay 33. The operation of relay 33 reverses the direction of the flow of current in the loop of the calling substation 1, which is in series with the impulse relay 34. The polarized relay 13 operates on this current reversal, closing an obvious circuit to operate relay 12. Relay 12 in turn closes an obvious circuit to operate relay 16, which locks under control of relay 18, in series with the retardation coil 17 to ground.

*Disconnect.*

When the receiver is replaced at the calling substation 1, relay 34 releases, in turn releasing relay 39. The release of relay 39 removes ground from test terminals 32 and 52, thus permitting relays 14, 19, and 23 to release. The release of relay 14 closes a circuit to operate the release magnet 35 of the selector switch S—1, thus restoring the brush rod to the normal position. The release of relay 19 connects the interrupter 9 in series with the winding of relay 11 under control of the right-hand inner armature and front contact of relay 18 and armature 10 of relay 19. Relay 11 operated connects battery of the proper polarity through the lamp 43 and the winding of relay 15 in series, through both sides of the loop of the calling substation 1 in parallel, through the coin disposal mechanism to ground at 58. The coin disposal mechanism operates over the circuit described to collect the coin. If the ground condition controlled by the coin is present at the calling substation 1 at this time relay 15 will operate, thus providing a holding circuit for relay 18. Relay 18 is made slow to release so that it does not release immediately when relay 11 operates, but will remain operated long enough for relay 15 to operate and provide a substitute holding ground in the manner described.

When the brush of the interrupter 9 encounters the insulated segment, relay 11 will release, removing the coin collect current from the calling substation 1, thus permitting the coin mechanism to restore and remove the ground previously provided under control of the deposited coin. When the interrupter 9 again reaches the metal segment, relay 11 will reoperate, reconnecting coin disposal current to the line. If the coin has been properly disposed of, the absence of ground at the calling substation 1 prevents relay 15 from reoperating; hence after an interval of time, relay 18 will release, thus removing ground supplied through the winding of retardation coil 17 from the conductor 53. The removal of this ground permits the line finder LF to release in a manner not shown. When relay 18 releases it opens the circuit of relay 11 which releases and the circuit is restored to normal.

*Ordinary call—no coin deposited.*

Let us assume that the calling substation 1 initiates an ordinary call, that is, a call for which a charge is imposed, but fails to deposit a coin before operating the dial at the calling substation 1.

Under these circumstances, the circuit functions in the manner previously described when a coin was deposited. At the end of the primary movement of the selector switch S—1, the test relay 23 is connected to one conductor of the calling line loop under control of relay 37.

No coin having been deposited at the calling substation 1, the ground ordinarily encountered will be absent and consequently the test relay 23 will fail to operate. Under these circumstances, solid ground at the left-hand front contact of relay 25 through the right-hand outer armature and back contact of the test relay 23 will remain connected to the test brush 22 of the selector switch S—1.

The presence of this solid ground on the brush 22 is equivalent to a busy condition upon the test terminal of every trunk in the group, and the secondary magnet 36 and the marginal relay 38 will operate in the manner previously described under "Ordinary call" and the brushes 20, 21, and 22 will advance in accordance with the secondary movement of the selector switch S—1 until the last trunk in the group has been passed over and the brushes are set in what is termed the "11th rotary step position". In this position, the contact springs designated "11th—rotary step" in the drawing will be operated, and solid ground at the left normal contact of relay 23 will be substituted for the ground previously supplied through the winding of the dial tone transformer DT.

During the secondary movement of the switch the impulse relay 24 will remain operated through its right winding in series with the right (non-inductive) winding of relay 37 to battery. When the relay 37 releases at the end of the secondary movement of the selector switch S—1, ground which is supplied at the left hand normal contact of relay 23 will be connected to the loop of the calling station 1. Under this condition the absence of any tone in the receiver at the substation 1 will indicate to the calling station that the call has not progressed properly due to the failure to deposit a coin in the coin controlled mechanism.

Under these conditions the receiver will be replaced upon the switchhook of the calling substation 1, permitting the selector switch S—1 to release and another call will be initiated in the proper manner.

*Free calls.*

Let us assume, however, that the calling substation 1 desires to obtain a connection with a free line, such, for example, as the zero operator. In this event the receiver is removed from the switchhook in the usual way and the dial at the calling station 1 is operated and released in accordance with the code number of the zero operator, which is usually 0. The selector switch S—1 will accordingly be set in accordance with its primary movement upon the proper trunk level which we will assume to be the 10th or 0 trunk level, of the switch. On this level the brush 46 engages a commutator segment 45 which is connected to conductor 56, thus providing an alternative path to operate the test relay 23 by way of armature 49 and front contact of relay 25 to ground. Relay 23 operated locks in the manner previously described. The selector switch now tests for and seizes an idle trunk in the manner previously described under "Ordinary call" and the connection is extended to the zero operator, displaying a signal at her position as an indication that a call is in waiting. When the call is answered by the zero operator there is no current reversal in the calling line loop, thus preventing relays 13, 12 and 16 from operating. The failure of relay 16 to operate causes the current supplied to the calling line to dispose of any coin deposited in the coin controlled mechanism to be in a direction to operate the coin disposal magnet in such a manner as to cause the return of the coin.

While for purposes of illustration the brush 46 has been described as establishing a circuit over segment 45 and conductor 56 only on the tenth or zero level of selector S—1, it is evident that by multipling the segments corresponding to other levels of the switch bank, the test relay 23 may be arranged so that it will operate on any desired level to enable free calls to be made.

It is also evident that the selector switch S—1 may be arranged so as to distinguish between ground supplied by depositing a coin at the calling substation 1, which ground being supplied through the resistance of the coin control mechanism is of comparatively high resistance, and a ground such as may be caused by placing a false signal on the line. This ground is usually of comparatively low resistance. The selector switch may be arranged to meet this condition in any suitable manner. One way of accomplishing this has been illustrated. The marginal relay 72 is shown connected in series with the test relay 23 and provided with an armature and front contact wired in parallel with the right hand outer armature and back contact of the test relay 23. Thus, whenever the marginal relay is operated due to the placing of an improper ground signaling condition on the line of the calling substation 1, the operation of the marginal relay connects ground at its front contact to the test brush 22. The test relay 23 operates as illustrated in the manner already described. A coil 73 of suitable resistance approximately equal to the resistance of the winding of the magnet in the coin controlled mechanism is also inserted in series with the brush 46. It would obviously be necessary for the test relay 23 to be operated and the marginal relay in question to be normal, in order to permit a call to an ordinary line to progress in the proper manner. To obtain this condition on the test relay 23 and the marginal relay referred to, it would be necessary to apply ground of the proper resistance to one conductor of the line of the calling substation 1.

What is claimed is:

1. In a telephone system, calling lines, each operable to establish various circuit conditions thereon, called lines, classified as charge lines, other called lines classified as free lines, switching mechanism including a selector switch controllable by a calling line to build up a connection to any desired called line, means for preventing said selector switch from functioning in accordance with its normal mode of operation to build up a connection, and means in said selector switch responsive to a particular circuit condition established at the calling station for nullifying the effect of said first means to permit said selector switch to function in accordance with its normal mode of operation to build up a connection to a charge line.

2. In a telephone system, calling lines, each operable to establish various circuit conditions thereon, called lines classified as charge lines, other called lines classified as free lines, switching mechanism including a selector switch controllable by a calling line to build up a connection to any desired called line, means for preventing said selector switch from functioning in accordance with its normal mode of operation to build up a connection, means in said selector switch responsive to a particular circuit condition established at the calling station for nullifying the effect of said first means to permit said selector switch to function in accordance with its normal mode of operation to build up a connection to a charge line, and means in said selector switch operable irrespective of the circuit condition established on the calling line for permitting said selector switch to operate to build up a connection to a free line.

3. In a telephone system, calling lines, means associated with each calling line for establishing various circuit conditions thereon, called lines classified as charge lines, other called lines classified as free lines, a train of automatic switches operable under control of a calling line to build up a connection to any desired called line, means for preventing said automatic switches from functioning in accordance with their normal mode of operation to build up a connection, and means in one switch of the train responsive to a particular circuit condition established at the calling station for nullifying the effect of said preventing means to permit said switch to function in accordance with its normal mode of operation to build up in part a connection to a charge line.

4. In a telephone system, calling lines, means associated with each calling line for establishing various circuit conditions thereon, called lines classified as charge lines, other called lines classified as free lines, a train of automatic switches operable under control of a calling line to build up a connection to any desired called line, means for preventing said automatic switches from functioning in accordance with their normal mode of operation to build up a connection, means in one switch of the train responsive to a particular circuit condition established at the calling station for nullifying the effect of said preventing means to permit said switch to function in accordance with its normal mode of operation to build up in part a connection to a charge line, and means in said switch operable irrespective of the circuit condition established at the calling station for permitting said switch to function in accordance with its normal mode of operation to build up a connection to a free line.

5. In a telephone system, calling lines, means associated with each calling line for establishing various circuit conditions thereon, called lines classified as charge lines, other called lines classified as free lines, a train of automatic switches operable under control of the calling line to build up a connection to any desired called line, one of the switches in said switch train having both a primary and a secondary movement, means for preventing said last mentioned switch from functioning in accordance with its normal secondary movement, and means in said last mentioned switch effective at the end of the primary movement thereof responsive to a particular circuit condition established at the calling station for nullifying the effect of said preventing means to initiate the secondary movement of said switch in accordance with its normal mode of operation to build up in part a connection to a charge line.

6. In a telephone system, calling lines, means associated with each calling line for establishing various circuit conditions thereon, called lines classified as charge lines, other called lines classified as free lines, a train of automatic switches operable under control of the calling line to build up a connection to any desired called line, one of the switches in said switch train having both a primary and a secondary movement, means for preventing said last mentioned switch from functioning in accordance with its normal secondary movement, means in said last mentioned switch effective at the end of the primary movement thereof responsive to a particular circuit condition established at the calling station for nullifying the effect of said preventing means to initiate the secondary movement of said switch in accordance with its normal mode of operation to build up in part a connection to a charge line, and means in said switch effective at the end of the primary movement thereof irrespective of the circuit condition established at the calling station for permitting said switch to function in accordance with its normal mode of operation to build up a connection to a free line.

7. In a telephone system, calling lines, a coin controlled mechanism associated with each calling line, called lines classified as charge lines, other called lines classified as free lines, switching mechanism including a selector switch controllable by a calling line to build up a connection to any desired called line, means for preventing said selector switch from functioning in accordance with its normal mode of operation, and means in said selector switch responsive to the deposit of a coin in the coin controlled mechanism associated with the calling line for nullifying the effect of said first means to permit said selector switch to operate to build up a connection to a charge line.

8. In a telephone system, calling lines, a coin controlled mechanism associated with each calling line, called lines classified as charge lines, other called lines classified as free lines, switching mechanism including a selector switch controllable by a calling line to build up a connection to any desired called line, means for preventing said selector switch from functioning in accordance with its normal mode of operation, means in said selector switch responsive to the deposit of a coin in the coin controlled mechanism associated with the calling line for nullifying the effect of said first means to permit said selector switch to operate to build up a connection to a charge line, and means in said selector switch operable irrespective of the presence or absence of a coin in the coin controlled mechanism for permitting said selector switch to operate to build up a connection to a free line.

9. In a telephone system, calling lines, a coin controlled mechanism associated with each calling line, called lines classified as charge lines, other called lines classified as free lines, a train of automatic switches operable under control of a calling line to build up a connection to any desired called line, one of the switches in said switch train having both a primary and secondary movement, means for preventing said last mentioned switch from functioning in accordance with its normal secondary movement, means in said last mentioned switch effective at the end of the primary movement thereof responsive to the deposit of a coin in the coin controlled mechanism associated with the calling line for nullifying the effect of said first means to initiate the secondary movement of said switch in accordance with its normal mode of operation to build up in part a connection to a charge line, and means in said switch operable irrespective of the presence or absence of a coin in the coin controlled mechanism for initiating the secondary movement of said switch in accordance with its normal mode of operation to build up a connection to a free line.

10. In a telephone system, calling lines, a coin controlled mechanism associated with each line, a plurality of groups of trunk circuits, a numerical switch operable under control of a calling line whereby said switch may be set opposite any desired trunk group, called lines classified as charge lines reached via said switch and one of certain of said trunk groups, other called lines classified as free lines reached via said switch and one of the remaining trunk groups, means in said switch responsive to the depositing of a coin in the coin controlled mechanism associated with the calling line for permitting said switch to seize an idle trunk in the trunk group leading to a charge line opposite which group said switch is set, and means in said switch operable irrespective of the presence or absence of a coin in the coin controlled mechanism providing said switch is set opposite a trunk group leading to a free line for permitting said switch to seize an idle trunk in said trunk group.

11. In a telephone system, calling lines, a coin controlled mechanism associated with each calling line, a plurality of groups of trunk circuits, a numerical switch operable under control of the calling line whereby said switch may be set opposite any desired trunk group, called lines classified as charge lines reached via said switch and certain of said trunk groups, other called lines classified as free lines reached via said switch and others of said trunk groups, a relay in said switch operable responsive to the deposit of a coin in the coin controlled mechanism associated with the calling line for permitting said switch to seize an idle trunk in the trunk group leading to a charge line opposite which group said switch is set, and means responsive to the setting of said switch opposite a trunk group leading to a free line for permitting said switch to seize an idle trunk in said trunk group.

12. In a telephone system, calling lines, a coin controlled mechanism associated with each calling line, a plurality of groups of trunk circuits, a numerical switch having a primary and a secondary movement operable under control of the calling line whereby said switch may be set in accordance with its primary movement opposite any desired trunk group, called lines classified as charge lines reached via said switch and one of certain of said trunk groups, other called lines classified as free lines reached via said switch and one of the remaining trunk groups, means in said switch responsive to the deposit of a coin in the coin controlled mechanism associated with the calling line for initiating the secondary movement of said switch in accordance with its normal mode of operation whereby an idle trunk in any selected trunk group may be seized, and means responsive to the selection of a trunk group leading to a free line for initiating the secondary movement of said switch irrespective of the presence or absence of a coin in the coin controlled mechanism associated with the calling line.

13. In a telephone system, calling lines, a coin controlled mechanism associated with each calling line, a plurality of groups of trunk circuits, a numerical switch having a group hunting movement followed by a trunk hunting movement operable under control of the calling line and having access to said trunk groups, a non-numerical switch operable responsive to the initiating of a call on a calling line for extending the calling line to said numerical switch, called lines classified as charges lines reached via said numerical switch and one of certain of said trunk groups, other called lines classified as free lines reached via said numerical switch and one of the remaining trunk groups, means in said numerical switch responsive to the deposit of a coin in the coin controlled mechanism associated with the calling line for initiating the trunk hunting movement of the numerical switch in accordance with its normal mode of operation, and means responsive to the selection of a trunk group leading to a free line for initiating the trunk hunting movement of said numerical switch irrespective of the presence or absence of a coin in the coin controlled mechanism associated with the calling line, a plurality of sources of current capable of being applied to the calling line to dispose of the deposited coin, means responsive to the disconnection of the calling station for causing one of said current sources to be applied to the calling line to dispose of the coin, means for maintaining said non-numerical switch in operative relation with the calling line until the coin has been disposed of, and means effective after the coin has been disposed of for causing said non-numerical switch to release the calling line.

14. In a telephone system, calling lines, a coin controlled mechanism associated with each calling line, called lines, switching mechanism controllable by a calling line to build up a connection to any desired called line, means for preventing said switching mechanism from functioning in accordance with its normal mode of operation, means in said switching mechanism responsive to the deposit of a coin in the coin controlled mechanism associated with the calling line for nullifying the effect of said first means to permit said switching mechanism to operate to build up a connection to a called line, and means in said switching mechanism responsive to the simulated deposit of a coin to maintain the effect of said first means.

15. In a telephone system, calling lines, a coin controlled mechanism associated with each calling line, called lines, switching mechanism controllable by a calling line to build up a connection to any desired called line, means for preventing said switching mechanism from functioning in accordance with its normal mode of operation, a relay in said switching mechanism operable responsive to the deposit of a coin in the coin controlled mechanism associated with the calling line for nullifying the effect of said first means to permit said switching mechanism to operate to build up a connection to a called line, and a second relay operable only when a line condition simulating the deposit of a coin is established to maintain the effect of said first means.

In witness whereof, I hereunto subscribe my name this 14 day of March, 1927.

HENRY HOVLAND.